United States Patent
Yamamoto et al.

(10) Patent No.: US 9,819,503 B2
(45) Date of Patent: Nov. 14, 2017

(54) SERVER DEVICE FOR EXCHANGING MESSAGES

(71) Applicant: DeNA Co., Ltd., Tokyo (JP)

(72) Inventors: Mayumi Yamamoto, Tokyo (JP); Ichito Nagata, Tokyo (JP); Tomo Tsubota, Tokyo (JP); Mamoru Yamashiki, Tokyo (JP); Moe Matsue, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 947 days.

(21) Appl. No.: 13/961,015

(22) Filed: Aug. 7, 2013

(65) Prior Publication Data
US 2015/0046542 A1 Feb. 12, 2015

(51) Int. Cl.
*H04L 12/18* (2006.01)

(52) U.S. Cl.
CPC ...... *H04L 12/1822* (2013.01); *H04L 12/1827* (2013.01)

(58) Field of Classification Search
CPC .. H04L 51/32; H04L 12/1822; H04L 12/1827
USPC ........................................................ 709/206
See application file for complete search history.

(56) References Cited

U.S. PATENT DOCUMENTS

| 8,821,297 | B1* | 9/2014 | Nagata | H04L 51/046 463/1 |
| 9,269,081 | B1* | 2/2016 | Panzer | G06Q 50/01 |
| 2008/0250025 | A1* | 10/2008 | Abhyanker | G06Q 30/06 |
| 2009/0024488 | A1* | 1/2009 | Romley | G06Q 10/10 705/80 |
| 2009/0217196 | A1* | 8/2009 | Neff | G06Q 10/10 715/799 |
| 2009/0234876 | A1* | 9/2009 | Schigel | G06F 17/30873 |
| 2010/0042717 | A1* | 2/2010 | Strandell | G06Q 10/107 709/224 |
| 2010/0125634 | A1* | 5/2010 | Boutboul | G06Q 50/01 709/206 |

(Continued)

FOREIGN PATENT DOCUMENTS

| JP | 2000-022706 A | 1/2000 |
| JP | 2010-237970 A | 10/2010 |

OTHER PUBLICATIONS

Japanese Patent Application No. 2012-166584: Office Action dated Nov. 11, 2012.

*Primary Examiner* — Nicholas Taylor
*Assistant Examiner* — Chong G Kim
(74) *Attorney, Agent, or Firm* — Procopio, Cory, Hargreaves & Savitch LLP

(57) ABSTRACT

Since only users registered in a chatting service are subject of friends on the chatting service, unregistered users cannot become friends. A server apparatus controls a message exchanged between registered users who are registered in a chatting service, and controls a message exchanged between a registered user and an unregistered user. Also, the server apparatus manages a friend list of the registered user, and recommends other user to be added to the friend list with respect to the registered user. Also, the server apparatus determines other user to be recommended to the registered user by using a predetermined condition set according to the presence or absence of registration in the chatting service.

13 Claims, 10 Drawing Sheets

(56) References Cited

U.S. PATENT DOCUMENTS

| | | | |
|---|---|---|---|
| 2010/0179916 A1* | 7/2010 | Johns | G06Q 50/01 705/319 |
| 2010/0299276 A1* | 11/2010 | Shahine | G06Q 50/01 705/319 |
| 2010/0333019 A1* | 12/2010 | Oschwald | G06Q 30/02 715/810 |
| 2011/0111743 A1* | 5/2011 | Boukai | G06F 8/61 455/419 |
| 2012/0131103 A1* | 5/2012 | Fox | H04L 67/02 709/204 |
| 2012/0135684 A1* | 5/2012 | Shrum, Jr. | H04N 21/25808 455/41.2 |
| 2012/0233020 A1* | 9/2012 | Eberstadt | G06Q 10/10 705/26.41 |
| 2012/0310823 A1* | 12/2012 | McNab | G06Q 20/10 705/39 |
| 2013/0024506 A1* | 1/2013 | Setton | G06Q 50/01 709/204 |
| 2013/0024513 A1* | 1/2013 | Sacks | G06Q 10/10 709/204 |
| 2013/0124338 A1* | 5/2013 | Chen | G06Q 30/0207 705/14.69 |
| 2013/0227030 A1* | 8/2013 | Eidelson | H04L 67/1095 709/206 |
| 2014/0006517 A1* | 1/2014 | Hsiao | G06Q 50/01 709/205 |
| 2014/0108562 A1* | 4/2014 | Panzer | G06Q 50/01 709/206 |
| 2014/0188681 A1* | 7/2014 | Shahghasemi | G06Q 20/22 705/37 |
| 2015/0026272 A1* | 1/2015 | Nagata | H04L 51/32 709/206 |
| 2015/0281369 A1* | 10/2015 | Venolia | G06Q 10/06 709/204 |
| 2016/0140637 A1* | 5/2016 | Szabo | G06Q 30/0623 705/14.54 |

* cited by examiner

__US 9,819,503 B2__

SERVER DEVICE FOR EXCHANGING MESSAGES

BACKGROUND OF THE INVENTION

Field of the Invention

The present invention relates to technology for transmitting and receiving a message by using an information processing terminal.

Description of the Related Art

In the past, a so-called chatting service has been provided which performs a real-time text communication by using an information processing device such as a personal computer (PC) terminal or a portable terminal.

As a chatting mode, there is an inter-user chatting performed between users on a one-to-one basis, an intra-group chatting performed among a plurality of users belonging to a particular group, or an inter-group chatting. In the past, there is JP 2000-022706 A disclosing technology that performs chatting by forming a group between users.

Services, to which the inter-user chatting, the intra-group chatting, or the inter-group chatting is applied, can be frequently seen, but these services are subjected to a predetermined approval process, such as friend registration or a group registration, at the start of chatting.

Multifunctional portable terminals, called smartphone, have been rapidly spread since 2010. Many chatting services premised on the use in portable terminals are provided, and the number of users is increasing. Due to the spread of such services, a service function to increase new unknown friends or acquaintances is expected.

SUMMARY OF THE INVENTION

However, in the past technology, since a friend on a chatting service is intended for only a user registered in the service, an unregistered user cannot become a friend.

The present invention has been made in view of such problems, and it is an object of the present invention to provide a server apparatus, method, and program, in which even a user unregistered in a chatting service can be registered as a friend in the chatting service.

An aspect of the present invention relates to a server apparatus. The server apparatus is a server apparatus that controls a message exchanged between registered users who are registered in a chatting service, and controls a message exchanged between a registered user and an unregistered user. The server apparatus includes a friend list management unit configured to manage a friend list of the registered user, and a suggest unit configured to recommend to the registered user other user to be added to the friend list. The suggest unit determines other user to be recommended to the registered user by using a predetermined condition set according to the presence or absence of registration in the chatting service.

According to such an aspect, the unregistered user can be registered as a friend in the friend list by determining other user to be recommended by using the predetermined condition set according to the presence or absence of registration in the chatting service.

Also, the server apparatus may further include a suggest list management unit configured to register user information of other user recommended by the suggest unit in the suggest list. The friend list management unit may add user information, which is selected by the registered user among the user information included in the suggest list, to the friend list.

Also, the suggest list management unit may delete the user information from the suggest list along with the addition of the user information to the friend list.

According to such an aspect, other user can easily be registered as a friend by adding the user information, which is related to other user selected by the registered user, to the friend list. Also, by deleting the user information from the suggest list along with the addition to the friend list, incorrect recommendation can be prevented. That is, it is possible to prevent other user registered as a friend from being recommended again.

Also, in the server apparatus, when an unregistered user who is not registered in the chatting service and user information of the unregistered user is included in the user information managed by the registered user, the suggest unit may determine the unregistered user as other user to be recommended to the registered user.

According to such an aspect, even the unregistered user can become a friend by determining the unregistered user as other user to be recommended to the registered user when the user information of the unregistered user is included in the user information managed by the registered user.

Also, in the server apparatus, when the user information of the unregistered user is included in the user information managed by the registered user and mobile contact information is included in the user information, the suggest unit may determine the unregistered user as other user to be recommended to the registered user.

According to such an aspect, the chatting system well used in the mobile can be frequently used by determining the unregistered user as other user to be recommended to the registered user when the mobile contact information is included in the user information of the unregistered user.

Also, in the server apparatus, with respect to a first user who is an unregistered user, the suggest unit may determine the previously registered user, who already adds the first user to the friend list when being unregistered, as other registered user to be recommended after the first user becomes a registered user.

According to such an aspect, with respect to a first user who is an unregistered user, by determining the previously registered user, who already adds the first user to the friend list when being unregistered, as other registered user to be recommended after the first user becomes a registered user, a plurality of friends is recommended to the unregistered user from the beginning of new registration. Therefore, it is easy to form a friend relationship, and a motivation to use the chatting service can be increased.

Also, in the server apparatus, when a user is registered in the chatting service and the registered user is included in the friend list of the user, the suggest unit may determine the user as other user to be recommended to the registered user.

According to such an aspect, by determining the user as other user to be recommended to the registered user when the registered user is included in the friend list of the user, each user can registered as a friend in the friend list, and thus, a subsequent chatting can be smoothly performed.

Also, in the server apparatus, when a user is registered in the chatting service and transmits and receives a message with the registered user on the chatting service at the present time or in the past, the suggest unit may determine the user as other user to be recommended to the registered user.

According to such an aspect, when a message is transmitted and received between the user and the registered user on the chatting service at the present time or in the past, a user acquainted through the chatting can easily be registered as a friend by determining the user as other user to be recommended to the registered user.

Also, the server apparatus may further include a group setting unit configured to set a plurality of groups each having particular characteristic, and a group management unit configured to manage the groups by associating groups selected by the registered user among the plurality of groups set by the group setting unit with the registered user. When a user is registered in the chatting service and the user and the registered user are associated in the same group managed by the group management unit, the suggest unit may determine the user as other user to be recommended to the registered user.

According to such an aspect, by determining the user as other user to be recommended to the registered user when the user and the registered user are associated in the same group managed by the group management unit, the user belonging to the same group can easily be registered as a friend.

Also, in the server apparatus, when a user is registered in the chatting service and one or more common users are included in the friend list of each of the user and the registered user, the suggest unit may determine the user as other user to be recommended to the registered user.

According to such an aspect, by determining the user as other user to be recommended to the registered user when one or more common users are included in the friend list, a user having many common friends can easily be registered as a friend.

Also, in the server apparatus, when a user is registered in the chatting service and the user and the registered user are a friend on a social networking service (SNS), the suggest unit may determine the user as other user to be recommended to the registered user.

According to such an aspect, by determining the user as other user to be recommended to the registered user when the user and the registered user are a friend on the SNS, a friend on the SNS can easily be registered as a friend on the chatting system.

Also, the server apparatus may further include: a search unit configured to search one or more users to be displayed with respect to all pieces of user information stored in the server apparatus when a search is performed based on a request from the registered user and with respect to users included in a suggest list of the registered user when there is no request from the registered user; a display order determination unit configured to determine display order of one or more pieces of user information searched by the search unit; and a display control unit configured to display the user information of the users searched by the search unit on a chatting window of the registered user in the order determined by the display order determination unit.

According to such an aspect, by determining the display order of one or more pieces of the searched user information, a user having a close relationship with the registered user can be preferentially displayed.

Also, in the server apparatus, when a plurality of users is searched by the search unit, the display order determination unit may determine the display order such that the priority of the user, in which the registered user is included in the friend list among the plurality of searched users, has a high rank.

According to such an aspect, by determining the display order such that the priority of the user, in which the registered user is included in the friend list, has a high rank, the user adding oneself to the friend list can be preferentially displayed. Therefore, the registered user can efficiently know the user having a higher intimacy.

Also, in the server apparatus, when a plurality of users is searched by the search unit, the display order determination unit may determine the display order such that the priority of the user has a higher rank as the user has a larger number of message transmission and reception with the registered user at the present time or in the past among the plurality of searched users.

According to such an aspect, by displaying the users according to the number of times of chatting at the present time or in the past, the registered user can efficiently know the user estimated as having a higher intimacy.

Also, the server apparatus may further include a group setting unit configured to set a plurality of groups each having particular characteristic, and a group management unit configured to manage the groups by associating a group selected by the registered user, among the plurality of groups set by the group setting unit, with the registered user. Also, when a plurality of users is searched by the search unit, the display order determination unit may determine the display order such that the priority of the user has a higher rank as the user has a larger number of groups associated with the registered user among the plurality of searched users.

According to such an aspect, by displaying the users such that the users having a larger number of groups registered by each other have a higher rank, the registered user can efficiently know the users estimated as having a higher intimacy.

Also, in the server apparatus, the display order determination unit sets conditions for determining the display order as follows:

(Condition 1) The presence or absence of the registered user in the friend list (Condition 2) The number A of message transmission and reception with the registered user (Condition 3) The number B of groups associated with the registered user (Condition 4) The number C of common users in each other's friend list Regarding the respective conditions, when priority points P1 to P4 are set, the display order may be determined according to the magnitude of a value calculated by the following equation.

$$P1+A \times P2+B \times P3+C \times P4$$

Also, in the server apparatus, the display order determination unit sets the points as follows: $P1 \geq P2 \geq P3 \geq P4$.

According to such an aspect, the registered user can efficiently know the user estimated as having a higher intimacy.

Another aspect of the present invention is a method. The method is a method that controls a message exchanged between registered users who are registered in a chatting service, and controls a message exchanged between a registered user and an unregistered user. The method includes managing a friend list of the registered user, and recommending to the registered user other user to be added to the friend list, and determines other user to be recommended to the registered user by using a predetermined condition set according to the presence or absence of registration in the chatting service.

Another aspect of the present invention is a program. The program is a program that controls a message exchanged between registered users who are registered in a chatting service, and controls a message exchanged between a registered user and an unregistered user. The program method includes managing a friend list of the registered user, and recommending to the registered user other user to be added to the friend list, and causes a computer to execute processing of determining other user to be recommended to the registered user by using a predetermined condition set according to the presence or absence of registration in the chatting service.

Also, arbitrary combinations of the above-mentioned components and modifications of the expressions of the present invention among the method, the apparatus, and the computer program are also effective as aspects of the present invention.

According to the present invention, even an unregistered user can be registered as a friend on a chatting service.

DETAILED DESCRIPTION OF THE INVENTION

Figure 1:
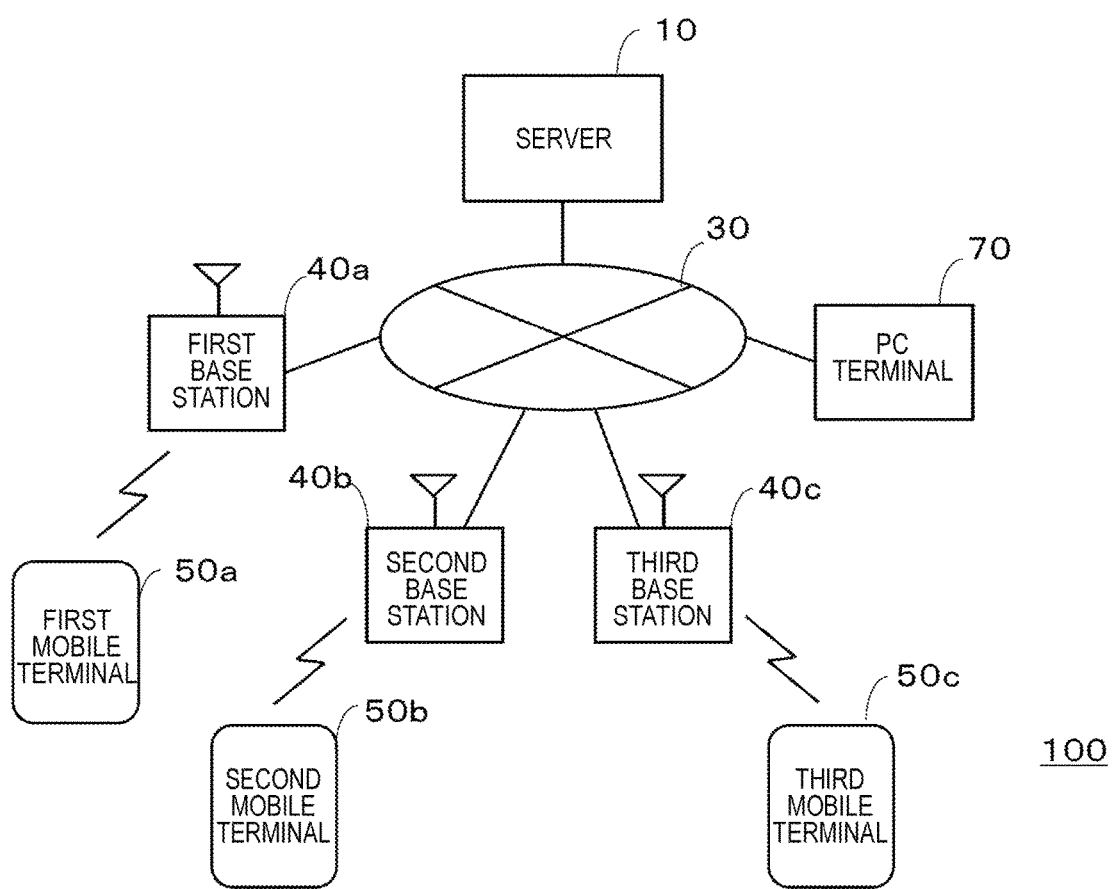
FIG. 1 is a diagram illustrating a chatting system according to a first embodiment.

Prior to description of embodiments of the present invention, the outline of the present invention will be first described below. The present invention relates to a chatting service for a message exchanged between information communication terminals. When a user registered in a chatting service (hereinafter, referred to as a "registered user") exchanges a message by using the chatting service, the registered user can chat with a counterpart, without consciousness that the counterpart is registered in the chatting service.

Also, the registered user can efficiently find a chatting counterpart or can browse registered user information of the chatting counterpart by registering an acquaintance (hereinafter, also referred to as a "friend") in a friend list on a chatting service management server (hereinafter, referred to as a "chatting server"). Also, the friend list is managed for each registered user by the server.

Based on a list of friend candidates (hereinafter, referred to as a "suggest list") recommended from the chatting server, the registration in the friend list is achieved by selecting any one user included in the suggest list. Although details will be described below, a recommendation criteria is an "intimacy" with the registered user on the chatting service. As the intimacy is higher, the user is preferentially added to the suggest list. Also, the suggest list also includes a user who is not registered in the chatting service (hereinafter, referred to as an "unregistered user"). Also, the suggest list is managed for each registered user by the server.

The suggest list may include a list displayed when a search is performed by inputting an acquaintance's name on a chatting window, or a list displayed by uploading a phone book stored in the user terminal to the chatting server, and the like. Among the suggest lists generated in this manner, other user the registered user wants to register as a friend can be selected and registered in the friend list. Also, the order when the suggest list is displayed on the user terminal is a criteria corresponding to the above-described recommendation criteria, "intimacy".

Since even the unregistered user may be registered in the friend list, even an unregistered user who is newly registered in the chatting service may be already added to the friend list among the previously registered users. In these cases, after the unregistered user becomes a registered user, the previously registered user, who is already added to the friend list when being unregistered is recommended as a friend. In this way, a plurality of friends is recommended to the newly registered user from the beginning of the new registration. Therefore, it is easy to form a friend relationship and a motivation to use the chatting service can be increased.

The past chatting service has a problem in that although registered in the service, friends are not increased as expected, and hence, the frequency of use of the service may be lowered, or the use of the service is stopped. However, the present invention can solve the above problems and can have a chance to get a plurality of friends from the beginning of chatting, increasing a motivation to use the chatting service and contributing to the promotion of the chatting service. Hereinafter, a description will be given with reference to examples.

Embodiment 1

A first embodiment will be described below. FIG. 1 is a diagram illustrating a chatting system 100 according to a first embodiment of the present invention. The chatting system 100 includes a server 10, a network 30 configured to connect the server 10 and a base station 40 via a wired line, a first base station 40a to a third base station 40c represented by the base station 40, a first mobile terminal 50a to a third mobile terminal 50c represented by a mobile terminal 50, and a PC terminal 70.

Also, for convenience of illustration, only three base stations 40 and only three mobile terminals 50 are illustrated, but the present invention is not limited thereto, and more than three base stations 40 and more than three mobile terminals 50 may be present. The same is true of the PC terminal 70. Also, the first mobile terminal 50a to the third mobile terminal 50c are illustrated as being connected to the different base stations 40, respectively, but the present invention is not limited thereto. Even when the plurality of mobile terminals 50 is connected to one base station 40, it is obvious that the present invention can also be applied.

The server 10 is an apparatus for executing and providing a chatting service. The server 10 performs a communication processing for chatting processing with the mobile terminal 50 or the PC terminal 70 through the network 30 and the base station 40. Also, in the following, in order to simplify the description, the above description is simply expressed as "communication processing is performed between the server 10 and the mobile terminal 50 or the PC terminal 70", and the expression "through the network 30 and the base station 40" is omitted. Also, in the following, the mobile terminal 50 or the PC terminal 70 is also collectively expressed as a user terminal.

The server 10 downloads an application according to a request from the user terminal. Then, by uploading contact information stored in a memory of the user terminal and importing the contact information to a memory of the server 10, a user can start using the chatting service. Herein, the server 10 has a friend recommendation function of recommending a friend in the chatting system, a friend list management function of managing a friend list, a search function of searching a friend or a chatting counterpart, and an email integration function for chatting with a counterpart.

The friend recommendation function has a function (hereinafter, referred to as a "suggest function") of introducing or recommending a user to be registered in the friend list. Although details will be described below, the suggest function determines other user to be recommended to the registered user. The friend list management function has a function of registering a user selected among the recommended users by the registered user in the friend list. The search function searches user information stored in the server 10, and displays one or more pieces of searched user information on the user terminal in a predetermined order. The user information includes an ID of a registered user, an ID of a group to which the registered user belongs, a user ID of a past chatting counterpart, and a SNS ID.

The email integration function is a function for performing chatting with a desired user without making the user consider whether the chatting counterpart is a registered user. When there is a request to start the chatting service from the user terminal, the server 10 determines a communication method to a counterpart of the chatting service. Specifically, the most suitable communication method is determined from registration information stored in the memory of the server 10 according to priority information of the communication methods, and a message transmitted from the user terminal is converted into the communication method, for example, an email format, and is then transmitted to the counterpart.

As the communication method to be applied upon communication to the transmission counterpart, a chatting method is basically selected when the transmission counterpart is a registered user. On the other hand, when the transmission counterpart is an unregistered user, a method is selected according to information registered in the memory in regard to the unregistered user. Details will be described below. By taking such an aspect, the user can chat with the counterpart even when the counterpart is an unregistered user, without being conscious of it.

When using the chatting service, the user terminal first accesses the server 10 and downloads and installs an application. Then, contact information registered in the terminal is uploaded according to a request from the server 10. Then, when the chatting service is used, the application is started, a friend registered as the friend list or a user searched by the search function is stored as a destination, and a message is generated and transmitted to the destination. Incidentally, as described above, when using the chatting system 100, the user of the user terminal does not inquire whether the user of the destination is an unregistered user.

Figure 2:
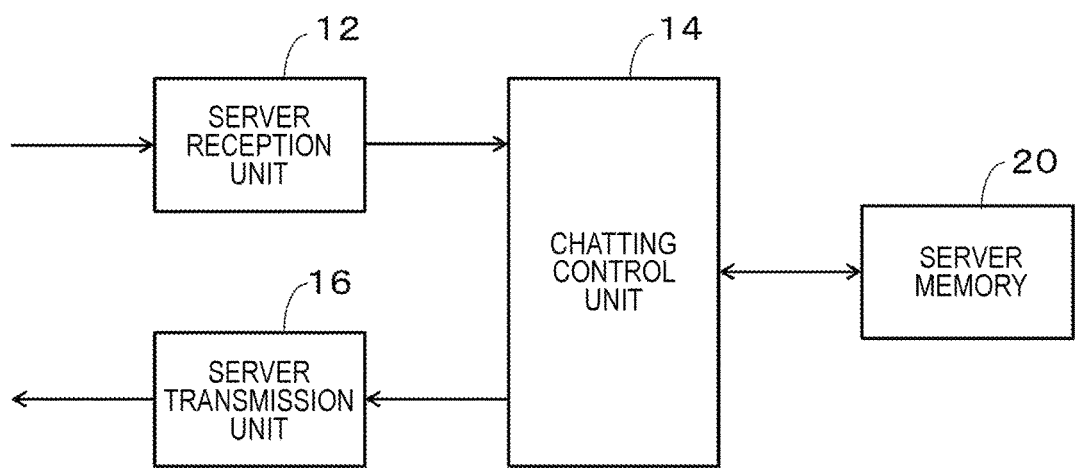
FIG. 2 is a diagram illustrating an example of a configuration of a server of the chatting system of FIG. 1.

FIG. 2 is a diagram illustrating an example of a configuration of the server 10 in the chatting system 100 of FIG. 1.

The server 10 includes a server reception unit 12, a chatting control unit 14, a server transmission unit 16, and a server memory 20.

The server reception unit 12 receives a signal from the user terminal, performs a predetermined demodulation processing, and transmits a demodulated signal to the chatting control unit 14. The server transmission unit 16 transmits a predetermined message to the transmission counterpart by a communication method selected by the chatting control unit 14. Also, the server transmission unit 16 acquires a friend list or a suggest list stored in the server memory 20 through the chatting control unit 14 at a predetermined timing, and transmits the friend list or the suggest list to the user terminal of the user associated with the list. Modulation and demodulation processing of the server reception unit 12 and the server transmission unit 16 may use modulation and demodulation technologies used in the past, and it is understood by a person with ordinary skill in the art that the present invention can also be applied to such an aspect.

The chatting control unit 14 receives a signal from the server reception unit 12, performs a processing according to the contents thereof, accesses the server memory 20, and instructs the server transmission unit 16 to transmit the signal. The signal received from the server reception unit 12 is a signal from the user terminal and is, for example, a request to download an application for using the chatting service (hereinafter, referred to as a "chatting application"), information uploaded from the user terminal, a selection of a user to be registered as a chatting counterpart or a friend, and a message to the destination.

Also, the chatting control unit 14 reads a chatting application to be downloaded to the user, with respect to the server memory 20, or imports contact information transmitted from the user terminal, or accesses information for determining the communication method. The chatting control unit 14 downloads the application to the user terminal according to a request from the user. After the download to the user terminal, the chatting control unit 14 inquires the user terminal about whether to import the contact information stored in the user terminal to the server 10. When the import is permitted, the contact information is transmitted from the user terminal, and the chatting control unit 14 writes the information to the server memory 20.

Also, the chatting control unit 14 has a friend recommendation function, determines other user to be recommended to the registered user, as a friend candidate, by using a predetermined condition set according to the presence or absence of registration in the chatting service, and registers the user in the suggest list of the server memory 20. The predetermined condition set according to the presence or absence of registration in the chatting service indicates a case where the user to be recommended is a registered user, and a case where the user to be recommended is an unregistered user. This condition is a condition for estimating intimacy with the recommended user.

Also, the chatting control unit 14 has a friend list management function, and registers a user selected from the registered user in the friend list of the server memory 20, the user being received through the server reception unit 12 among users registered in the suggest list as friend candidates. The friend list is managed for each registered user in the server memory 20.

Also, the chatting control unit 14 has a search function. When there is no request from the registered user, the chatting control unit 14 searches one or more users to be displayed with respect to the users included in the suggest list of the registered user which is stored in the server memory 20. The searched users are displayed on the user terminal as friend candidates.

When a plurality of users is searched, the display order is determined by a predetermined algorithm, and the searched users are displayed on a chatting window of the user terminal. That is, the list of friend candidates is displayed on the user terminal as "maybe friends". A search timing and a display timing may be performed when the chatting service application is started, or may be performed at regular intervals. This can give the user an opportunity to increase friends.

Also, the chatting control unit 14 receives a request to search a real time from the registered user through the server reception unit 12, acquires a real name of a search target, and searches the real name in all pieces of user information stored in the server memory 20. The search may use an existing search technology such as a front match or a partial match.

When a plurality of users is searched, the display order is determined by the predetermined algorithm determined according to intimacy with the registered user, and the searched users are transmitted through the server transmission unit 16 and displayed on the chatting window of the user terminal. The suggest list is managed for each registered user in the server memory 20.

Also, when the communication method to the destination is determined, the chatting control unit 14 selects one communication method from one or more communication methods registered in the server memory 20 with respect to the destination, according to information indicating the priority of the communication methods to be applied. The "information indicating the priority of the communication methods to be applied" or details of the selection will be described below.

Figure 3:
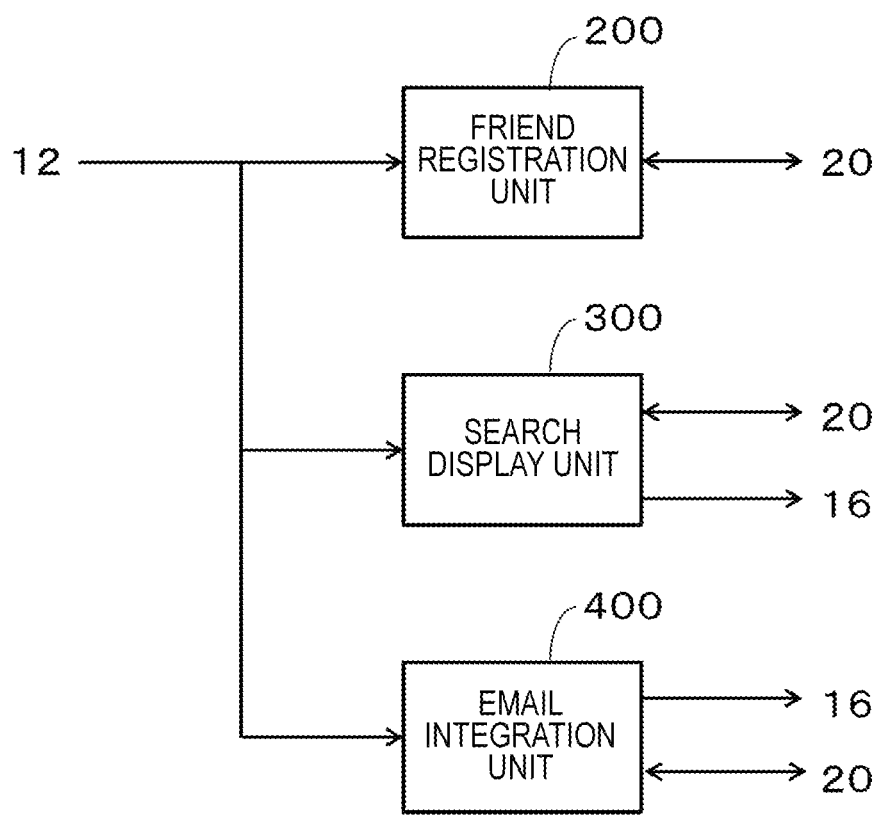
FIG. 3 is a diagram illustrating an example of a configuration of a chatting control unit of FIG. 2.

FIG. 3 is a diagram illustrating an example of a configuration of the chatting control unit 14 of FIG. 2. The chatting control unit 14 includes a friend registration unit 200, a search display unit 300, and an email integration unit 400. The friend registration unit 200 has a friend list management function, and manages the suggest list and the friend list of the server memory 20.

The search display unit 300 has a search function, performs a search by using the suggest list or the user information of the server memory 20, and displays the search result on the chatting window of the user terminal in the display order determined by the predetermined algorithm. The email integration unit 400 determines the communication method to the destination, based on the destination and the outgoing message received from the user. Also, the email integration unit 400 has an email integration function, and manages an event based on a request from the user terminal. Hereinafter, these will be described in sequence.

(1) Friend List Management Function

Figure 4:
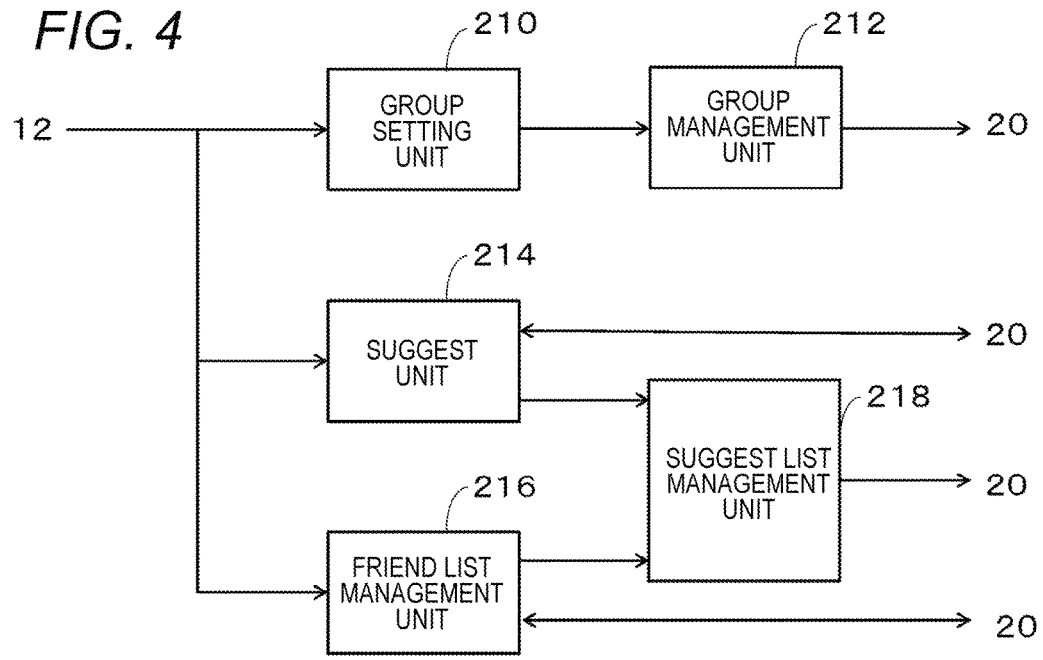
FIG. 4 is a diagram illustrating an example of a configuration of a friend registration unit of FIG. 3.

First, the friend list management function by the friend management unit 200 of FIG. 3 will be described. FIG. 4 is a diagram illustrating an example of a configuration of the friend registration unit 200 of FIG. 3. The friend management unit 200 includes a group setting unit 210, a group management unit 212, a suggest unit 214, a friend list management unit 216, and a suggest list management unit 218.

The group setting unit 210 sets a plurality of groups each having particular characteristic. The group management unit 212 manages the groups by associating groups selected by the registered user among the plurality of groups set by the group setting unit 210 with the registered user on the server memory 20.

The "group" is generated by arbitrary users, with the presence of arbitrary common matters between users, such as the same hobby or common area. Users can join the group by invitation from user belonging to the group or his/her own choice. When the user joining the group, a group ID of the joined group is added to his/her own user information. The use of the group ID makes it easy to perform chatting between particular members or generate and manage an event, which is to be described below.

The friend list management unit 216 manages the friend list for each registered user in the server memory 20. The suggest unit 214 recommends other user to be added to the friend list with respect to the registered user, considering intimacy with the registered user. The suggest unit 214 determines other user to be recommended to the registered user by using a predetermined condition set according to the presence or absence of registration in the chatting service. Details will be described below. The suggest list management unit 218 registers user information of other user determined by the suggest unit 214 in the suggest list of the server memory 20.

The friend list management unit 216 adds user information, which is selected by the registered user among the user information included in the suggest list, in the friend list of the server memory 20. The suggest list management unit 218 deletes the user information from the suggest list of the server memory 20 along with the addition of the user information to the friend list.

Operation examples (A) to (G) of the suggest unit 214 will be described in sequence. All are determined by the user to be recommended to the registered user, depending on the height of intimacy with the registered user. Also, (A) is an operation example in a case where an unregistered user is to be recommended, and (B) to (G) are operation examples in a case where a registered user is to be recommended.

(A) When a user is unregistered in the chatting service, and user information not included in the friend list is included in the contact information stored in the user terminal, the suggest unit 214 adds the user to the suggest list of the server memory 20 as a friend candidate. Even a registered user may be added to the suggest list. Also, the user to be added may be limited to a case where mobile contact information, for example, mobile phone number or email address, is included in the contact information.

The operation example (A), for example, may be performed with the upload of the contact information of the user terminal to the server 10. In addition to a case where the chatting application is downloaded, the upload is performed when new information is added to the contact information or is periodically performed. Therefore, the user can register the friend registered in the user terminal as a friend on the chatting service.

(B) With respect to a first user who is an unregistered user, the suggest unit 214 adds the registered user, who already adds the first user to the friend list when being unregistered, in the suggest list of the server memory 20 as other registered user to be recommended after the first user becomes a registered user. Therefore, the first user being a new registered user can register a lot of friends in the friend list immediately after the start of the chatting service.

(C) When other user adding the user oneself in the friend list as an arbitrary user is present, the suggest unit 214 adds the other user to be recommended in the suggest list of the server memory 20 as a friend candidate.

The operation example (C), for example, registers other user of the registration executor in the suggest list of the registered user, with the new registration of other user in the friend list. With the registration as friends to each other, a subsequent communication can be easily performed and a whole chatting service can be activated.

(D) When a user transmits and receives a message with the registered user on the chatting service at the present time or in the past, the suggest unit 214 adds the user to be recommended in the suggest list of the server memory 20 as a friend candidate.

The operation example (D), for example, registers a user in the suggest list of the registered user, when the user is entered after new entry of the registered user or a user being entered before the entrance of the registered user in the chat room where the registered user is entered, in a virtual space for starting chatting on the chatting system, called a chat room. Also, a user being with the registered user in the same chat room in the past is also a target to be registered in the suggest list. In this manner, when a user is in the same chat room at the present time or in the past, the user ID of the user in the same chat room is stored in the user information of the registered user, and the suggested unit 214 performs recommendation processing, based on this. Also, the chat room may be formed by the user belonging to the same group, or may be formed by users belonging to a plurality of groups, for example, a user belonging to the same group and a user belonging to other group. The suggest unit 214 may recommend a user chatting with the registered user or being with the registered user in the same chat room, regardless of the group to which the user belongs.

(E) When a user belonging to the same group is present, the suggest unit 214 adds the user to be recommended to the suggest list of the server memory 20 as a friend candidate.

In the operation example (E), when a registered user is newly registered in a group, or other user is newly registered in a group where the registered user is registered, the newly entered user is registered in the suggest list of the registered user. This can activate a communication within the group, and even a user participating in the group late can actively participate in the group. Also, the suggest unit 214 may make a recommendation on a condition combined with the above-described (D). That is, the suggest unit 214 may recommend a user chatting with the registered user or being with the registered user in the same chat room and a user being in the same group.

(F) The suggest unit 214 adds a user, who has common friends in the friend list, to the suggest list of the server memory 20 as a friend candidate. The operation example (F) may be performed when the number of the common friends is equal to or more than a predetermined number, for example, three.

(G) When a friend on the SNS is a registered user, the suggest unit 214 adds the user to be recommended to the suggest list of the server memory 20 as a friend candidate on the chatting service. This processing may be performed when the request to link to the SNS is received from the user terminal through the server reception unit 12. The SNS includes a community on a network, such as Facebook (registered trademark). Therefore, even friends on the SNS can easily be registered as a friend on the chatting service.

Although seven cases have been enumerated, the present invention is not limited thereto. When there are users having common matters estimated as having a high intimacy, such as the same age, the same date of birth, the same residence as the search user, and experience of participation in an event managed by an event management function to be described below, the users may be registered in the suggest list of the registered user.

Also, when the friend is a friend on the SNS of the registered user and the friend is unregistered in the chatting service, the friend registration unit 200 may give a notification that urges the friend to register in the chatting service. The notification may be performed via email and includes a message for guiding to a registrable URL. This can efficiently increase registrants of the chatting service.

(2) Search Function

Figure 5:
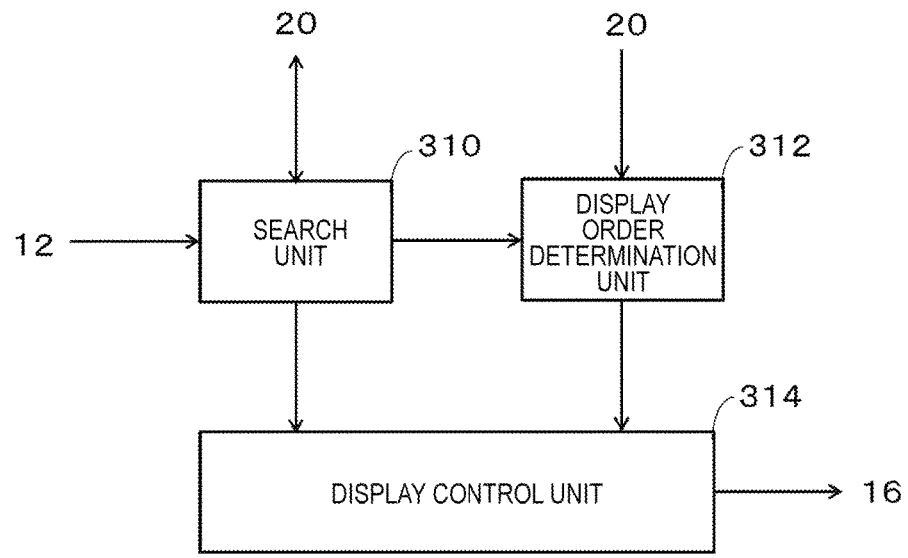
FIG. 5 is a diagram illustrating an example of a configuration of a search display unit of FIG. 3.

Next, the search function by the search display unit 300 of FIG. 3 will be described. FIG. 5 is a diagram illustrating an example of a configuration of the search display unit 300 of FIG. 3. The search display unit 300 includes a search unit 310, a display order determination unit 312, and a display control unit 314. Also, in the following, a registered user performing a search is also referred to as a search user.

When a search is performed based on a search request from the registered user, such as an input of characters in the search window displayed on the user terminal of the search user, the search unit 310 searches one or more users to be displayed, based on all pieces of user information stored in the server apparatus. When there is no request from the registered user, the search unit 310 searches one or more users to be displayed, with respect to the users included in the suggest list of the registered user upon start of the chatting application or periodically.

When a plurality of users is searched by the search unit 310, the display order determination unit 312 determines the display order of user information thereof by using a predetermined condition. The predetermined condition is determined according to the height of intimacy with the search user. The display control unit 314 displays user information of the users searched by the search unit 310 on the chatting window of the registered user in the order determined by the display order determination unit 312.

The predetermined condition in the display order determination unit 312 will be described below.

(Condition 1) The Presence or Absence of the Search User in the Friend List

The display order determination unit 312 determines the display order such that the priority of a user, in which the search user is included in the friend list (the search user is registered in the friend list) among the plurality of searched users, has a high rank.

(Condition 2) The Number of Message Transmission and Reception with the Search User Also, the display order determination unit 312 determines the display order such that the priority of a user has a higher rank as the user has a larger number of message transmission and reception with the search user at the present time or in the past among the plurality of searched users.

(Condition 3) The Number of Groups Associated with the Search User

Also, the display order determination unit 312 determines the display order such that the priority of a user has a higher rank as the user has a larger number of groups associated with the search user among the plurality of searched users.

(Condition 4) The Number of Common Users in Each Other's Friend List

The display order determination unit 312 determines the display order such that the priority of a user has a higher rank as the user has a larger number of users commonly registered in each other's friend list with respect to the search users among the plurality of searched users.

Although four cases have been enumerated, the present invention is not limited thereto. The display order may be determined on a condition of presence of common matters estimated as having a high intimacy with the search user, such as the same age, the same date of birth, the same residence as the search user, and experience of participation in an event managed by an event management function to be described below.

Also, the display order determination unit 312 may set priority points P1 to P4 with respect to the conditions 1 to 4 for determining the display order. At this time, when the "number of transmission and reception" in the condition 2 is set as A, the "number of groups associated with the search user" in the condition 3 is set as B, and the "number of common users in each other's friend list" in the condition 4 is set as C, the display order determination unit 312 may calculate scores according to equation of "P1+A×P2+B×P3+C×P4" and determine the display order such that a rank is higher as the score is larger. Also, the display order determination unit 312 may set the priority points to P1≥P2≥P3≥P4. Also, P1 to P4 are real numbers, and A to C are positive integers.

(3) Email Integration Function

Figure 6:
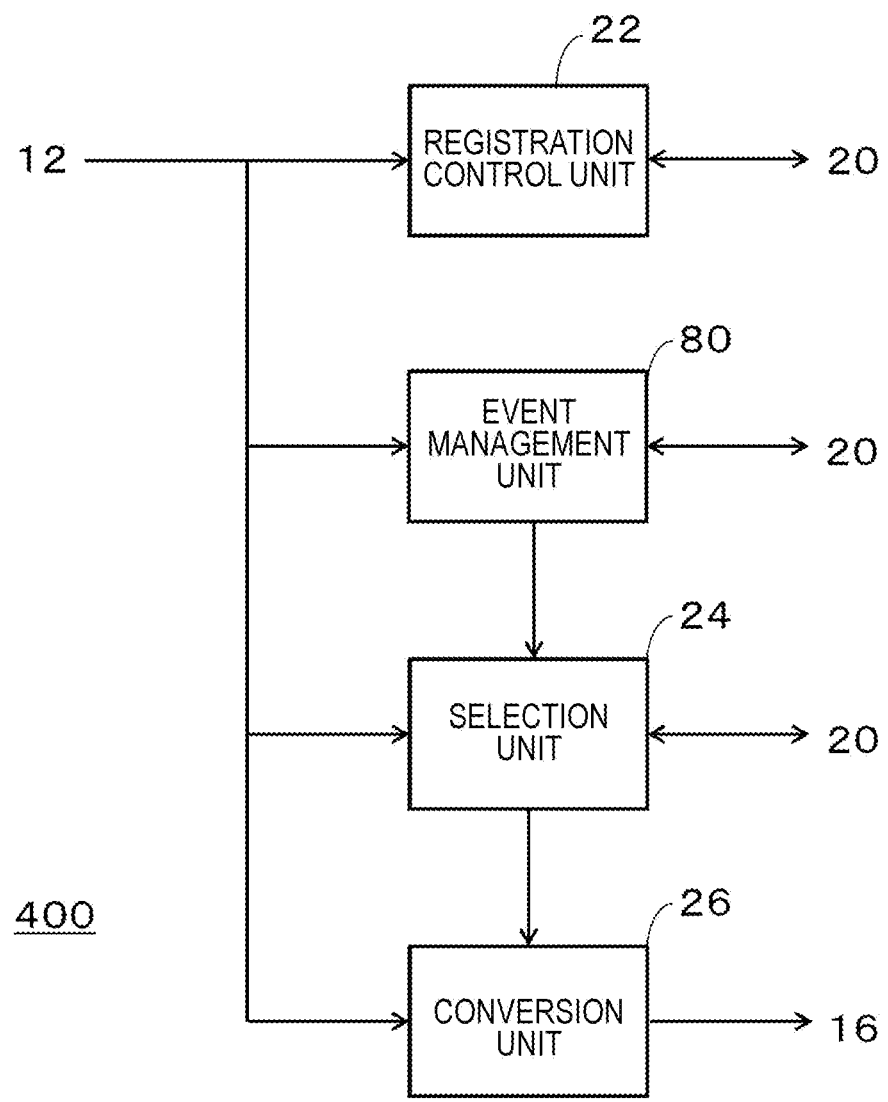
FIG. 6 is a diagram illustrating an example of a configuration of an email integration unit of FIG. 3.

Last, the email integration function by the email integration unit 400 of FIG. 3 will be described below. FIG. 6 is a diagram illustrating an example of a configuration of the email integration unit 400 of FIG. 3. The email integration unit 400 includes a registration control unit 22, a selection unit 24, a conversion unit 26, and an event management unit 80.

The registration control unit 22 registers contact information acquired from the user terminal in the server memory 20. The selection unit 24 accesses the server memory 20 to acquire information of the destination, in response to a chatting request from the user terminal, determines a communication method to the destination, and transmits the communication method to the conversion unit 26. The conversion unit 26 converts a message to the destination received from the user terminal into a format of the communication method transmitted from the conversion unit 26. The conversion by the conversion unit 26 may be performed by a well-known method.

The event management unit 80 accesses the server memory 20 and manages event information according to an instruction related to the event from the user, which is received through the server reception unit 12. The instruction related to the event includes an input of information related to the event from the user, or information related to the user who wants to urge participation in the event. Also, the event management unit 80 displays a predetermined image on a chatting interface window of the user terminal according to an instruction related to the event from the user. Hereinafter, these will be described in sequence.

When the chatting application is installed on the user terminal and the contact information of the user terminal is uploaded, the registration control unit 22 registers the contact information in the server memory 20. At that time, first, the registration control unit 22 assigns an ID to the user terminal that becomes the subject of upload.

Also, the registration control unit 22 checks the uploaded contact information with the contact information of the registered user. The contact information of the registered user is contact information of a user that is already registered in the chatting service. Also, the registration control unit 22 may check the uploaded contact information with the registered contact information. The registered contact information is contact information that is stored in the server memory 20 and includes contact information of an unregistered user which is already imported by other registered user.

The contact information includes a name, a phonetic, a phone number, a mobile phone number, an email address, SNS information, and user information or the like. The phone number, the mobile phone number, the email address, or the SNS information may be multiple. The SNS information includes one or more pieces of information necessary for identifying a user in a SNS, such as facebook, twitter, mixi and, Linkedin (all of four are registered trademarks), and contacting the user. The user information is information indicating whether an application for using the chatting system is installed, and is a flag for determining whether the user is a registered user or an unregistered user.

When it is checked that there is a common part in the two pieces of the contact information, the registration control unit 22 integrates the two pieces of contact information and stores the integrated contact information. For example, when two pieces of contact information are provided as shown below, a name and a phone number are identical in both pieces of the contact information. Therefore, both pieces of the contact information can be estimated as relating to the same person.

Uploaded Contact Information

| Name | A |
|---|---|
| Mobile phone number | 090-XXX-YYYY |
| Email address | b@ppp.co.jp |

Registered Contact Information

| Name | A |
|---|---|
| Mobile phone number | 090-XXX-YYYY |
| Phone number | 03-mmmm-nnnn |
| Email address | a@qqq.ne.jp |

Therefore, the registration control unit 22 integrates the two pieces of the contact information and stores one piece of contact information in the server memory 20 as follows.

Contact Information after Integration

| Name | A |
|---|---|
| Mobile phone number | 090-XXX-YYYY |
| Phone number | 03-mmmm-nnnn |
| Email address | a@qqq.ne.jp |
| Email address | b@ppp.co.jp |

When the two pieces of the contact information are completely matched with each other, the registration control unit 22 may not perform the integration processing. This is because there is no information to be interpolated with each other. Also, at the time of integration, with the number of common parts, a condition of whether to integrate, a condition that one or more pieces of predetermined information are matched, and a combination thereof may be provided. This is because as the number increases, the probability of the relation to the same person increases. Also, since one or more pieces of predetermined information, for example, a name and a mobile phone number, which are unchangeable or are difficult to change, may be determination criteria, the probability of the relation to the same person can further increase. Also, the aspect of processing speed and processing load and the increase of the probability have a trade-off relationship. However, considering these, it can be said that the suitable number is 2 to 3. Also, a combination of the name and the mobile phone number and/or the phone number is suitable as the predetermined information.

Next, the selection unit 24 will be described below. The selection unit 24 selects one or more communication methods from one or more communication methods registered in the server memory 20 with respect to the user of the received destination, depending on information indicating the priority of the communication method to be applied. However, the operations of the selection unit 24 are different in a case where a message received from the server reception unit 12 is a chat format and in otherwise case. This is because the message is a message from the registered user in the case of the chat format, and the message is a message from the unregistered user in the case of formats other than the chat format.

Herein, the case where the message received from the server reception unit 12 is the chat format will be described below with reference to examples. This example is based on the assumption that contact information of a user A, a user B, and a user C is stored in the server memory 20.

User A
Name
Email address
Registered user
User B
Name
Email address
SNS information
Unregistered user
User C
Name
Email address 1
Email address 2
Unregistered user Also, it is assumed that the information indicating the priority of the communication method to be applied (hereinafter, referred to as priority information) is set as follows. Also, the priority information, for example, is as follows. Priority 1 represents that the priority is highest, and as the number increases, the priority is lowered.

| Priority 1 | Chat format |
| Priority 2 | Email format |
| Priority 3 | SNS format |

Also, the priority information may be set to each registered user. Also, the registered user may arbitrarily set the priority information. Also, the priority information may be set such that the chat format always has the priority 1. In this case, the formats after the priority 2 may be arbitrarily set by the user.

In the above cases, a case where the user A is a destination will be described below. First, the selection unit 24 acquires user information among pieces of contact information stored for the destination. Herein, that the user of the destination is a registration user is proved by the user information. In this case, the chat format is selected.

Herein, the selection unit 24 instructs the conversion unit 26 to convert the received message into the chat format. Also, in the case of the registered user, the selection unit 24 may select the chat format without accessing the priority information.

Next, a case where the user B is a destination will be described below. Unlike the above-described case of the user A, the user B is an unregistered user. In this case, the selection unit 24 refers to the priority 2 among pieces of priority information. Since the priority 2 is the email format, the selection unit 24 checks whether the email address is present as contact information of the user B.

In the example, since the email address of the user B is present, the selection unit 24 selects the email format as the communication method. Also, in a case where the email address of the user B is not registered, it is determined whether the SNS format of the priority 3 is registered. In this case, since the SNS information is registered as registration information of the user B, the selection unit 24 selects the SNS format.

Next, a case where the user C is a destination will be described below. According to registration information of the user C, the user C is an unregistered user. Therefore, in order to determine whether the email format of the priority 2 can be selected, the selection unit 24 checks whether the email address is present in the registration information of the user C. Herein, two email addresses are present as the registration information of the user C. In such a case, the selection unit 24 preferentially selects the email address for the mobile phone.

Also, in a case where email addresses for two or more mobile phones are registered, the email address registered later may be selected as the email address. Since it is likely that the email address registered later is latest information registered more recently, a message can arrive at the user C more reliably.

Also, although the email format is set to the priority 2 as the priority information, the priority may be set according to the destination as shown in the following second example of the priority information.

Second Example of Priority Information

| Priority 1 | Chat format |
| Priority 2 | Email address for destination other than mobile phone |
| Priority 3 | Email address for mobile phone |

Also, as shown in the following third example of the priority information, it is also possible to set general-purpose email addresses, such as gmail.com or free address, which do not ask whether it is the mobile phone or other destination. By setting the priority information in such a manner, the destination can be more flexibly selected, and a message can arrive at the destination more reliably.

Third Example of Priority Information

| Priority 1 | Chat format |
| Priority 2 | General-purpose email address |
| Priority 3 | Email address for mobile phone |
| Priority 4 | Email address for destination other than mobile phone |

When the destination is an unregistered user, the conversion unit 26 adds a message received from the server reception unit 12 to URL information. The URL information is information regarding a link to a web page urging the unregistered user to invite the unregistered user to the chatting system. The unregistered user can access the server 10 by clicking this information, and can download the chatting application for performing chatting from there. Then, the conversion unit 26 converts a message to be transmitted into the format of the communication method instructed from the selection unit 24 and transmits the message to the server transmission unit 16.

Next, a case where a message received from the server reception unit 12 is a format other than the chat format will be described below. In this case, a message is a message from an unregistered user to a registered user. Therefore, in the server memory 20, registration information of the user being the destination is the registered user. Herein, the chat format is the priority 1 of the priority information regarding the registered user. Therefore, as described above, the selection unit 24 selects the chat format as the communication method of the message for the registered user.

Then, the conversion unit 26 converts the message received from the unregistered user into the chat format. The converted message is transmitted to the user terminal 50 being the destination through the server transmission unit 16. In the user terminal 50, the transmitted message is displayed in the chatting interface window on the display of the terminal. According to the above aspect, in the chatting system 100, the communication method is appropriately converted from the contact information and the priority information recorded in the server 10. In this manner, a smooth chatting can be realized between the registered user and the unregistered user, without causing the user to perform unnecessary operations.

Figure 8:
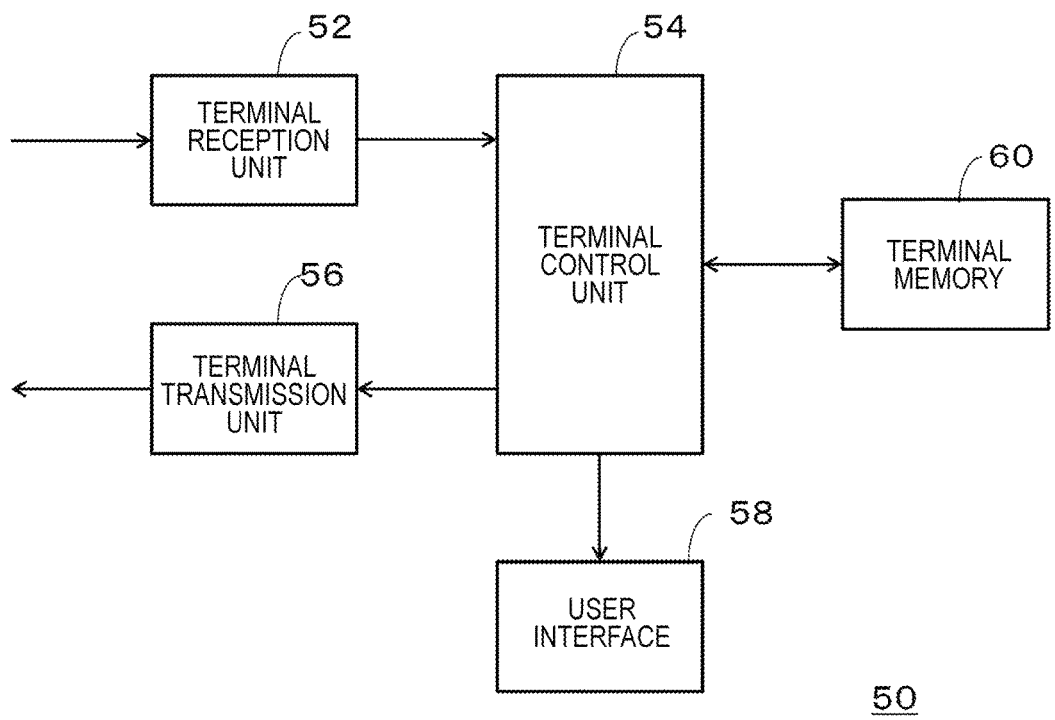
FIG. 8 is a diagram illustrating an example of a configuration of a mobile terminal or a PC terminal of FIG. 1.

Next, a configuration of a user terminal side will be described below. FIG. 8 is a diagram illustrating an example of a configuration of the mobile terminal 50 or the PC terminal 70 of FIG. 1. For convenience of description, the configuration of the mobile terminal 50 will be described, but the same is true of the PC terminal 70.

The mobile terminal 50 includes a terminal reception unit 52, a terminal control unit 54, a terminal transmission unit 56, a user interface 58, and a terminal memory 60. The terminal reception unit 52 receives the chatting application downloaded from the server 10, the suggest list or the friend list transmitted from the server 10, or the message from other user.

The terminal control unit 54 receives an instruction from the user, accesses the terminal memory 60, and performs an install control of the chatting application, an upload control of contact information registered in the terminal memory 60, a selection of a destination for chatting, or a management of a message to the destination.

Also, the user interface 58 displays a message to the user on a window, receives an instruction from the user, which is input as a result of manipulating a keyboard or a touch panel, and transmits the instruction to the terminal control unit 54. The message to the user is, for example, an inquiry of whether the contact information stored in the memory 60 can be imported to the server 10, a request to select a friend candidate displayed as the suggest list, a designation of a destination upon chatting, or an edit window of a message to the destination. These messages may be displayed on a predetermined chatting interface window.

Hereinafter, as an example of a scene that the user A starts using the chatting service, an overall operation of the mobile terminal 50 will be described below.

It is assumed that the user A installs the chatting application on the mobile terminal 50 of the user A. In such a case, the terminal control unit 54 displays a pop-up message, such as "do you want to import the address book?", on the user interface 58. When the user presses a Yes button, the contact information stored in the terminal memory 60 is imported to the server memory 20 of the server 10.

Also, when the chatting application is installed, the contact information stored in the terminal memory 60 of the user A may be automatically imported to the server 10, without any pop-up display or the like. Also, the import processing may be periodically performed. The import processing may be performed when new contact information is added to the terminal memory 60.

Then, in the server 10, the phone number or the email address included in the contact information is checked with the contact information of the registered user stored in the server 10. When the matched registered user exists, the contact information of the registered user and the imported address information are combined.

As such, when the chatting application is installed, the contact information regarding user's acquaintances and the like registered in the terminal memory 60 of the mobile terminal 50 is automatically registered as a chatting counterpart. Therefore, the user can start using the chatting service, without feeling stress.

Next, an example of a scene that the user A transmits and receives a message with the user B through chatting will be described below.

When the user A starts the chatting application, the user interface 58 displays information of users, who are registered as a friend in the friend list, as destination candidates. The user A selects, for example, the user B from the displayed candidates as a message transmission counterpart. The selected destination is notified to the server 10 through the terminal control unit 54 and the terminal transmission unit 56.

Then, the server 10 determines the message communication method (chatting, email, SNS) based on the contact information of the user B and the priority information. The priority information, as described above, is information representing priority about the communication method through which the message is to be transmitted. For example, the communication method is the chatting in a case where the priority information is given in order of chatting>SNS message>email address>SMS, and the user B is a registered user of the chatting service. Also, in a case where the user B is an unregistered user and only the email address and the phone number of the user B are known, the communication format by the email format having higher priority is selected.

When the user A writes a message to the user B in a message field of the chatting interface window displayed on a screen by the user interface 58 and presses a send button, the message is transmitted to the user B through the terminal control unit 54, the terminal transmission unit 56, and the server 10. When the email method is selected as the communication method to the user B, the server 10 converts the chat message of the user A into the email format, and the email is transmitted from the server 10 to the email address of the user B imported from the terminal memory 60.

When the user B being the unregistered user receives an email format message from the user A and replies to the message in an email format, the server 10 converts the email from the user B into a chat format message, transmits the message to the mobile terminal 50 of the user A, and displays the message in the chatting interface on the display of the terminal.

Figure 7:
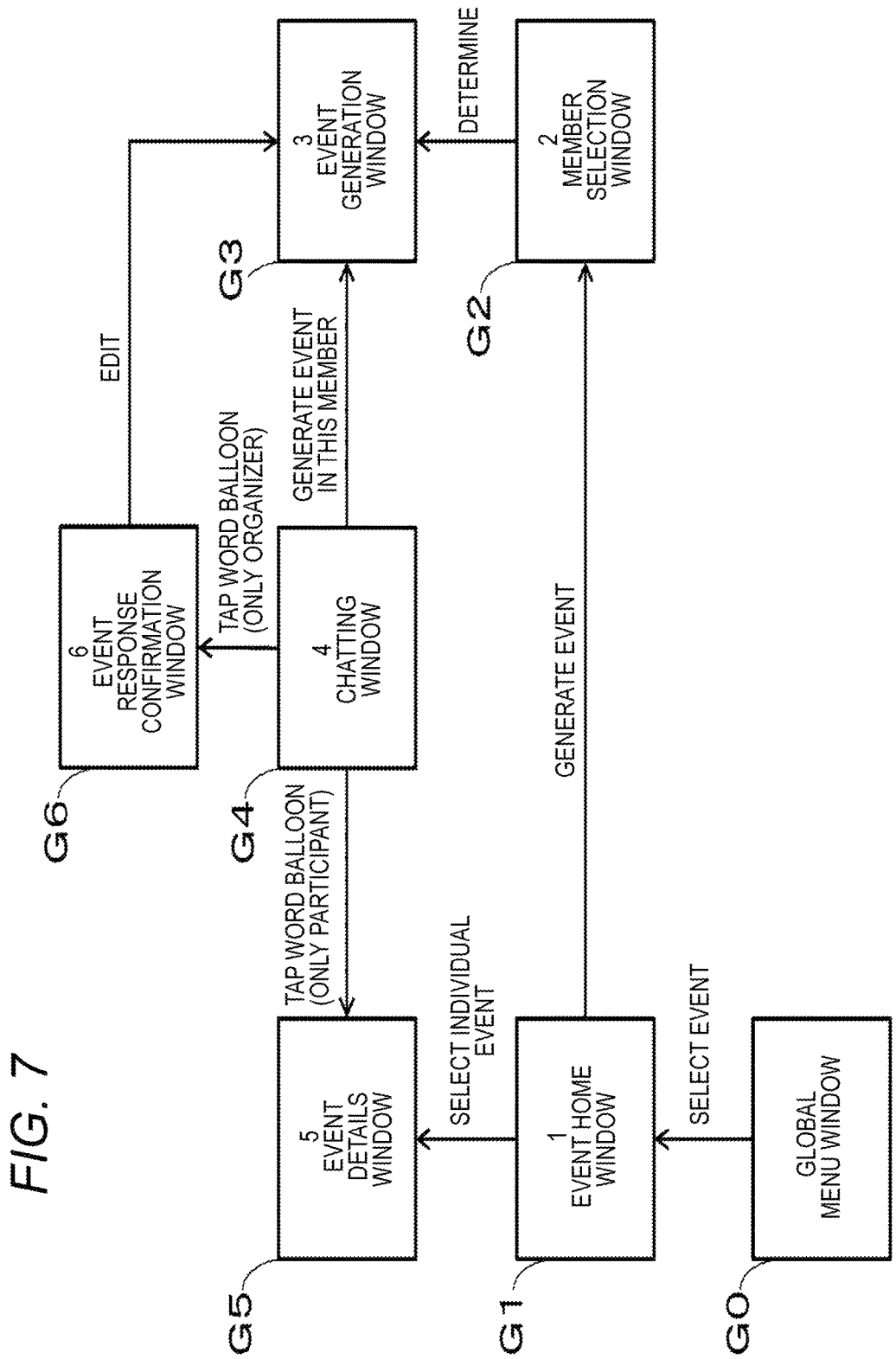
FIG. 7 is a diagram illustrating an example of a transition of a chatting interface window of an event management unit of FIG. 6.

FIG. 7 is a diagram illustrating an example of a transition of the chatting interface window in the event management unit 80 of FIG. 6. The chatting interface window includes a global menu window G0, an event home window G1, a user selection window G2, an event generation window G3, a chatting window G4, an event details window G5, and an event response confirmation window G6.

Event information managed in the server memory 20 of the server 10 is updated according to the instruction received from the user, and the chatting interface windows G0 to G6 are transitioned to respective windows as illustrated in FIG. 7 according to the aspect of the updating.

When the user starts chatting, the global menu window G0 being the initial window of the chatting system 100 is displayed on the user terminal. When the user makes a request to process the event, the window is transitioned to the event home window G1. The user generates and manages the event, with the event home window G1 as a starting point.

The event home window G1 is a window that is transitioned from the global menu window G0 and consolidates the event. The event home window G1 enables the user to check events which are in progress and in which the user participates in the past. As illustrated, a new event generation button G10 and an event field G12 are displayed on the event home window G1. An event image G14 or an event participant image G16 are displayed on the event field G12.

When generating a new event, the user can generate an event by tapping the new event generation button G10. When generating the event, the window is transitioned to the user selection window G2 that allows the user to select users querying the participation in the event.

The event field G12 displays a title, a date and time, a location, a participants list of the event. When individual event fields are tapped by the user, the window is transitioned to the event details window G5. The newly generated event is displayed at the top of the event field G12, and as the event is older, the event is displayed at a lower portion. When an event is finished or an event itself is deleted, the event is deleted from the event field G12. Also, compared with a new event, other display processing may be performed on an event displayed at a lower portion. For example, the event displayed at a lower portion may be displayed with a light color tone.

On the event image G14, an image representing a designated event in the event generation is displayed. When not designated, an arbitrary image may be displayed. On the event participant image G16, an image designated by a user responding to the effect of participation in the event is displayed.

The event generation window G3 displays a participation query user image G30, a user edit button G31, an event explanation field G32, a candidate addition button 33, a response candidate button G34, a schedule candidate field G35, a time candidate field G36, a free input button G37, a map display button G38, and a search button G39.

On the participation query user image G30, an image related to the user querying the participation is displayed. When the user taps the user edit button G31, the window is transitioned to the user selection window G2. The event explanation field G32 is a field for writing the title of the event and the explanation of the event. Also, the input of the title is essential. The candidate addition button 33 is a button that is tapped by the user when wanting to increase a candidate of a schedule, a time or a location. When the candidate addition button 33 is tapped by the user, a candidate is additionally displayed as illustrated.

The response candidate button G34 is a button that is tapped by the user querying the participation, and is a button for selecting a degree of participation in the event to be held in the displayed schedule, time and location from options. Options by three selections such as o, Δ and x are assumed herein, but are not limited thereto.

The schedule candidate field G35 and the time candidate field G36 are fields for writing a date and time of the event. As described above, when there is a plurality of candidates by the candidate addition button 33, the date and time of the event are written to each candidate.

The free input button G37 is a button that is tapped by the user when writing a comment. For the event generator, the map display button G38 is a button for setting information representing a corresponding location. For the user queried to participate in the event, the map display button G38 is a button for displaying location information. The location information may be an address, a phone number, map information, or a combination thereof. The search button G39 is a button for transition to a window for allowing the user queried to participate in the event to search location information or the like by a predetermined search tool.

The chatting window G4 is a window displayed on the chatting interface of the user queried to participate in the generated event. The chatting window G4 displays a single response mode field G40, an option mode field G41, an event explanation field G42, an option button G43, and a response button G44.

The single response mode field G40 is a window displayed when only one date and time and location of the event are set in the generated event. On the event explanation field G42, the title, date and time, and location of the event and the option button G43 are displayed. When the user queried to participate in the event taps the title of the event, the window is transitioned to the event details window G5. The response button G44, as illustrated, displays o, Δ and x. By tapping any one of o, Δ and x, the user queried to participate in the event can express the will to participate in the event.

Unlike the single response mode field G40, the option mode field 41 is a window displayed when a plurality of dates and times and locations is set with respect to one generated event. In the option mode, when the user taps the response button G44, the window is transitioned to the event details window G5, and the user expresses the will to participate with respect to each option from the event details window G5.

The event details window G5 displays a prospective participant user image G50, a non-responding user image G51, a list display button G52, a response button G53, a store image G54, a store link G55, and a comment field G56.

The prospective participant user image G50 displays an image designated by a user who already expresses the participation. Also, in the three-option response form, only the user responding to o may be displayed, users responding to o or Δ may be displayed, and a changed display form may be displayed. For example, colors of o and Δ may be changed.

On the non-responding user image G51, an image designated by a non-responding user is displayed. Compared with the prospective participant user image G50, the image may be displayed in other display form. FIG. 14 is an example of a case where an image is displayed with a slight white color tone.

The list display button G52 is a button for transition to the friend list window. When the user taps the response button G53, the options of the response is displayed, and the response is displayed by selecting one of the options. As illustrated, when a plurality of dates and times and locations is set, a plurality of response buttons G53 is displayed.

The store image G54 displays an image previously designated by the stores where the events are to be held. When the user taps the store link G55, a web page presenting information of the store is displayed. The comment field G56 is a field for writing a comment by the user having responding to the participation in the event.

The second display example of the chatting window G4 is an example of a window displayed when a user responds to an event participation query in the first display example or the event details window G5. In the second display example, a single response mode display field G60 and a selection mode field G61 are displayed according to the responded event. In each field, a prospective participant user image G62 designated by the user expressing the participation, and a transition button G63 for transition to the event details window G5 are displayed.

The event response confirmation window G6 is a window that can be checked by a user associated with an event organizer generating the event, and a response status at that time is displayed.

On the event response confirmation window G6, a prospective participant user image G64, a transition button G65 for transition to the event generation window G3, and an event option column G66 are displayed. On the event option column G66, candidate location and date and time of the event are displayed in column direction according to the number of candidates of the event. An aggregate field G68 displaying the number of persons responding to o, Δ and x for each candidate, and a response field G69 displaying the response of each respondent are displayed in row direction.

The event organizer visually checks an event participation/non-participation status, determines a candidate to be adopted, and taps an event determination button G67 displayed in a field of a candidate related to the adoption. When the event determination button G67 is tapped, a message to that effect is notified to the user who responds to the participation in the determined event. If the user is a registered user, the message is displayed on the chatting interface. If the user is an unregistered user, the notification is made by a converted communication method. Alternatively, an URL for informing the determined event is notified. Also, it may be notified to users who respond to the effect of uncertainty and impossibility of participation. In this case, the event organizer may notify a comment, and the comment may be selected from several preset fixed phrases.

The user generates an event in the chatting system, and responds to whether to participate in the event on the chatting with respect to the chatting counterpart. Also, the response obtained from the chatting counterpart is automatically aggregated, and the user can list the aggregate result.

Also, several candidates of the date and time or location of the event as well as the event participation or non-participation may respond to the chatting counterpart for each candidate. For the unregistered user of the chatting service, an URL of a web page is written in the body of the email so as to select the event participation or non-participation or a desired date. Alternatively, in the body of the email, different URLs are attached to the participation and the non-participation. When the URL of the participation is pressed, the user can respond as the participation. When the URL of the non-participation is pressed, the user can respond with the non-participation.

The scheduling management of the event or the like may have the following functions.
(1) The user hosting the event can adjust the schedule of the event with the friend and family. It is possible to respond to the participation or non-participation, a desired date and time, and a desired location, and the organizer can list aggregate result.
(2) The date and time of the event can be voted, and the aggregate can be made. Candidate of the date and time may be multiple. The same is true of the location. It may be an option of each event site where the event is hold.
(3) The respondent can respond from a plurality of options such as "o", "Δ", and "x".
(4) An event such as "recruit: person with free time now" can be held, without designating the date and time.
(5) A remind message can be sent to a user who does not respond by a preset date. Also, a message can be sent to prospective participants, for example, before 24 hours from the holding of the event.
(6) It can be performed on the web browser as well as the chatting interface, and both are synchronized. Therefore, even a user who is unregistered in the application can use the function easily.

In order to realize the above function, the server managing the chatting system generates event information, in which one or more candidate dates and times and one or more candidate locations are combined one by one, according to the user instruction, and queries whether to participate in the event with respect to the generated event information. In a case where a communication method other than the chatting is selected when whether to participate in the event is queried to the unregistered user or the like, URL information for receiving the response to participation or non-participation from the user may be included in the message.

Figure 9:
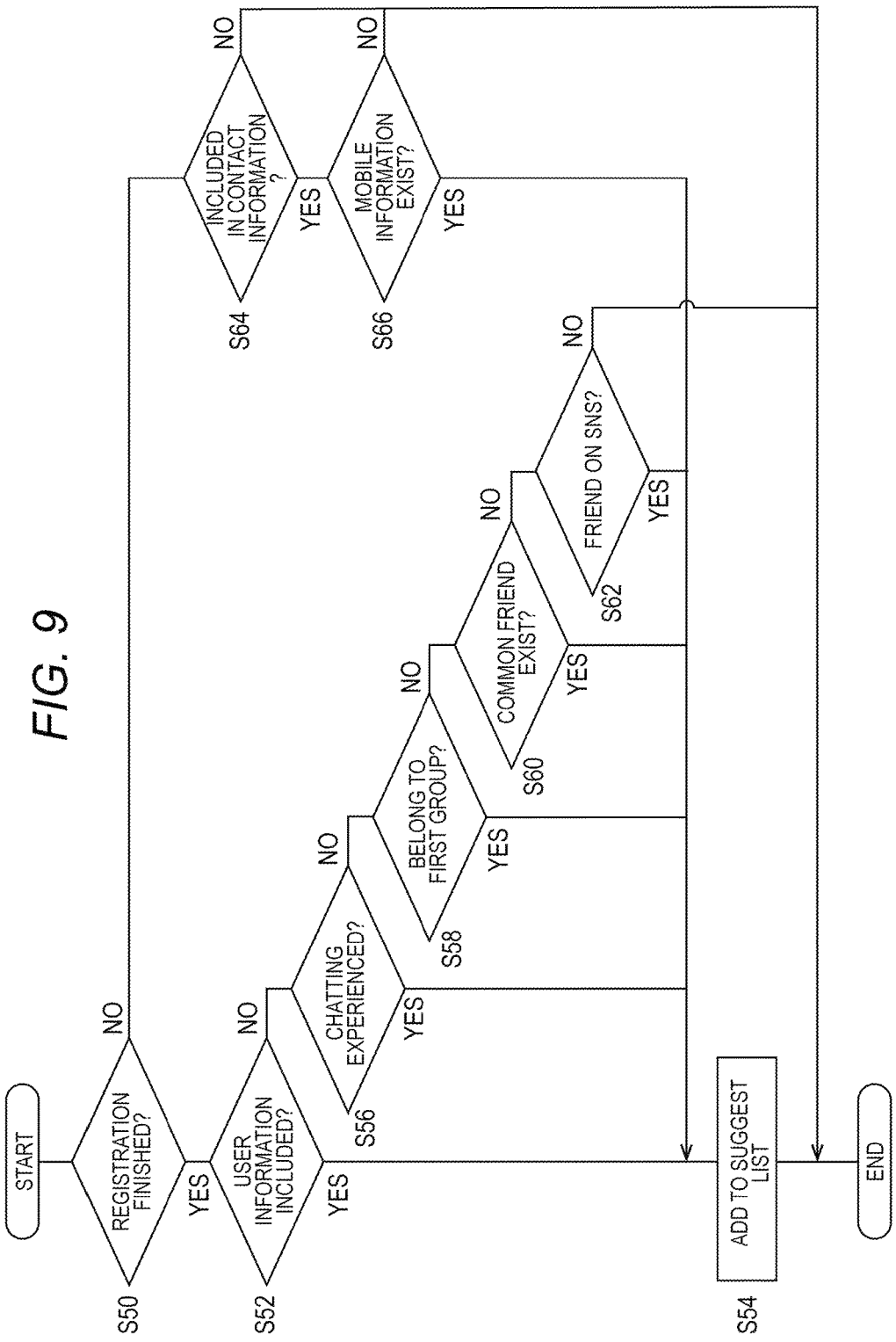
FIG. 9 is a flowchart illustrating a processing procedure example of the friend registration unit of FIG. 3.

FIG. 9 is a diagram illustrating a processing procedure example of the friend registration unit 200 of FIG. 3. The processing of the flowchart is for displaying a friend to be recommended to a user (hereinafter, referred to as a first user) on a user terminal of the first user. Also, the processing is performed when contact information uploaded from the user terminal is stored in the server memory 20 and the friend registration unit 200 accesses the server memory 20 and acquires one piece of user information stored in the server memory 20.

First, the friend registration unit 200 checks whether the user related to the acquired user information finishes registering in the chatting service (S50). When the user is registered (Y of S50), the friend registration unit 200 proceeds to processing of S52. When the user is unregistered (N of S50), the friend registration unit 200 proceeds to processing of S64.

In S52, when user information regarding the first user is included in a friend list of the acquired user information (Y of S52), the friend registration unit 200 adds the user related to the acquired user information to a suggest list so as to recommend the user to the first user (S54). When the user information is not included (N of S52), the friend registration unit 200 proceeds to processing of S56.

In S56, when the user related to the acquired user information performs chatting with the first user on the chatting service at the present time or in the past (Y of S56), the friend registration unit 200 adds the user related to the acquired user information to the suggest list so as to recommend the user to the first user (S54). When the user does not perform the chatting (N of S56), the friend registration unit 200 proceeds to processing of S58.

In S58, when one group ID among one or more group IDs registered in the acquired user information is matched with a group ID of a group among one or more groups to which the first user belongs (Y of S58), the friend registration unit 200 adds the user related to the acquired user information to the suggest list so as to recommend the user to the first user (S54). When the chatting is not performed (N of S58), the friend registration unit 200 proceeds to processing of S60.

Regarding S56 and S58, as another embodiment, in a chat room formed by the group to which the first user belongs and other group, the user performing chatting with the first user or the user being with the first user in the same chat room may be added to the suggest list so as to recommend the user to the first user. Also, as an added condition, the belonging group is not asked as long as the added user performs chatting with the first user or is with the first user in the same chat room. That is, the added user may belong to the group to which the first user belongs, or may belong to other group to which the first user does not belong. Also, a user of the same group may be preferentially recommended.

In S60, when one user ID among a plurality of user IDs registered in the friend list of the acquired user information is matched with any one of a plurality of user IDs registered in the friend list of the first user (Y of S60), the friend registration unit 200 adds the user related to the acquired user information to the suggest list so as to recommend the user to the first user (S54). When the chatting is not performed (N of S60), the friend registration unit 200 proceeds to processing of S62.

In S62, when the user related to the acquired user information is a friend of the first user on a SNS (Y of S62), the friend registration unit 200 adds the user related to the acquired user information to the suggest list so as to recommend the user to the first user (S54). When the chatting is not performed (N of S62), the processing is terminated.

In S64, when the acquired user information is included in the contact information uploaded from the user terminal of the first user (Y of S64), the friend registration unit 200 proceeds to processing of S66. When the acquired user information is not included (N of S64), the processing is terminated.

In S66, when mobile information of the user related to the acquired user information is included in the contact information uploaded from the user terminal of the first user (Y of S66), the friend registration unit 200 adds the user related to the acquired user information to the suggest list so as to recommend the user to the first user (S54). When the acquired user information is not included (N of S66), the processing is terminated.

Also, the processing of S52 to S62 may be in random order, may be determined independently, or may be determined in parallel.

Figure 10:
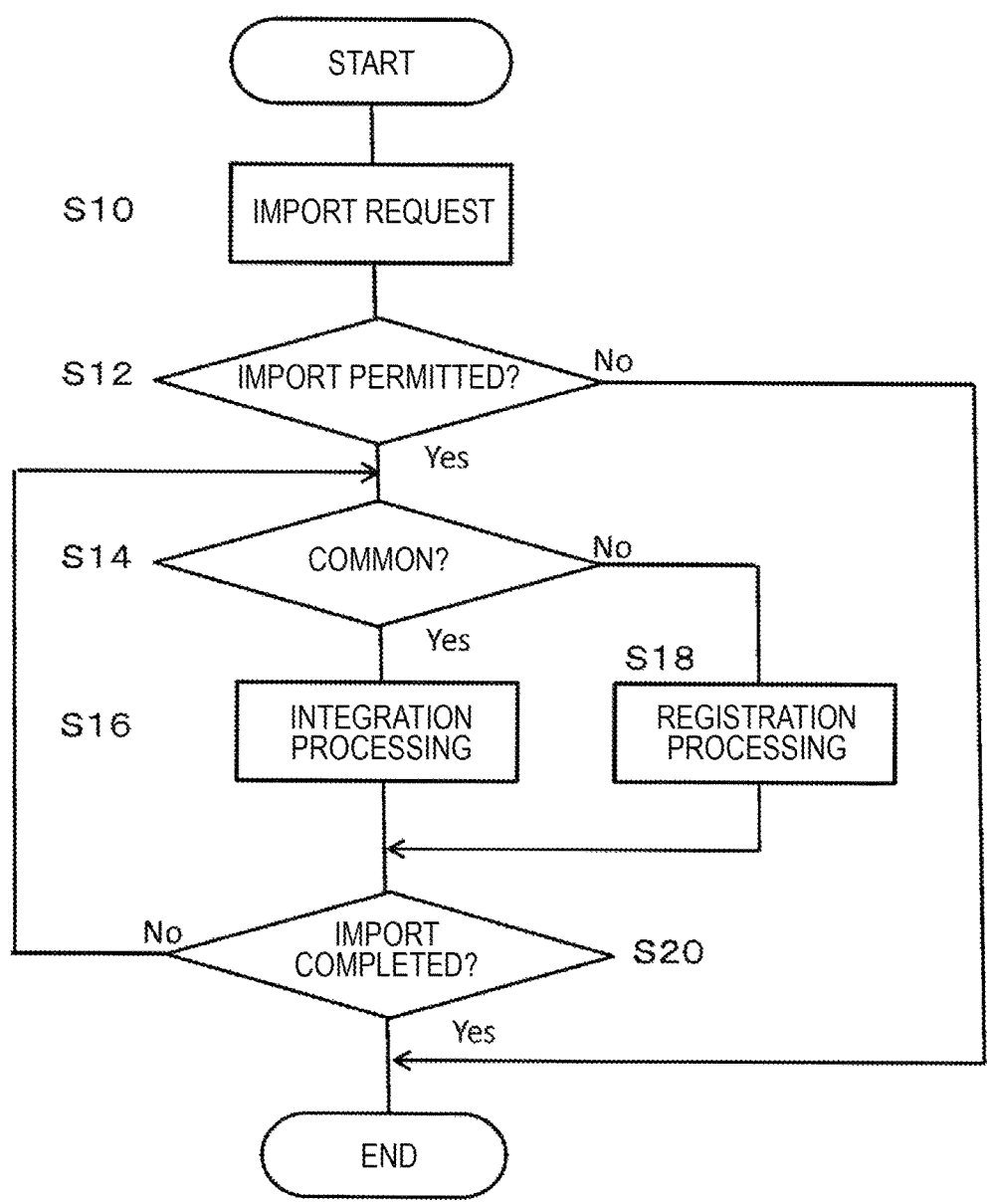
FIG. 10 is a flowchart illustrating a first processing procedure example of the email integration unit of FIG. 3.

FIG. 10 is a flowchart illustrating a first processing procedure example of the email integration unit 400 of FIG. 3. The first processing procedure example is started when the application is downloaded to the user terminal.

First, the email integration unit 400 makes an import request to the user terminal through the server transmission unit 16 (S10). The import request is to upload contact information stored in the memory of the user terminal to the server 10 and query whether the contact information may be stored in the server memory 20 of the server 10.

When a signal to the effect that the import from the user terminal is not permitted is received in the server reception unit 12 (No of S12), the email integration unit 400 ends the processing. On the other hand, when the signal to the effect that the import from the user terminal is permitted is received (Yes of S12), subsequently incoming contact information is acquired through the server reception unit 12.

The acquired contact information is checked with the contact information registered in the server memory 20. When common information exists (Yes of S14), the registration control unit 22 integrates the contact information stored in the server memory 20 with the acquired contact information (S16). On the other hand, when no common information exists (No of S14), the registration control unit 22 registers the acquired contact information in the server memory 20 as it is (S18). At that time, an ID or the like for specifying the contact information may be attached.

When all pieces of contact information to be imported are imported (Yes of S20), the chatting control unit 14 ends the processing. On the other hand, when other contact information exists (No of S20), the email integration unit 400 returns to processing of S14 and repeats processing of S14 to S20 until contact information to be imported does not exist.

Figure 11:
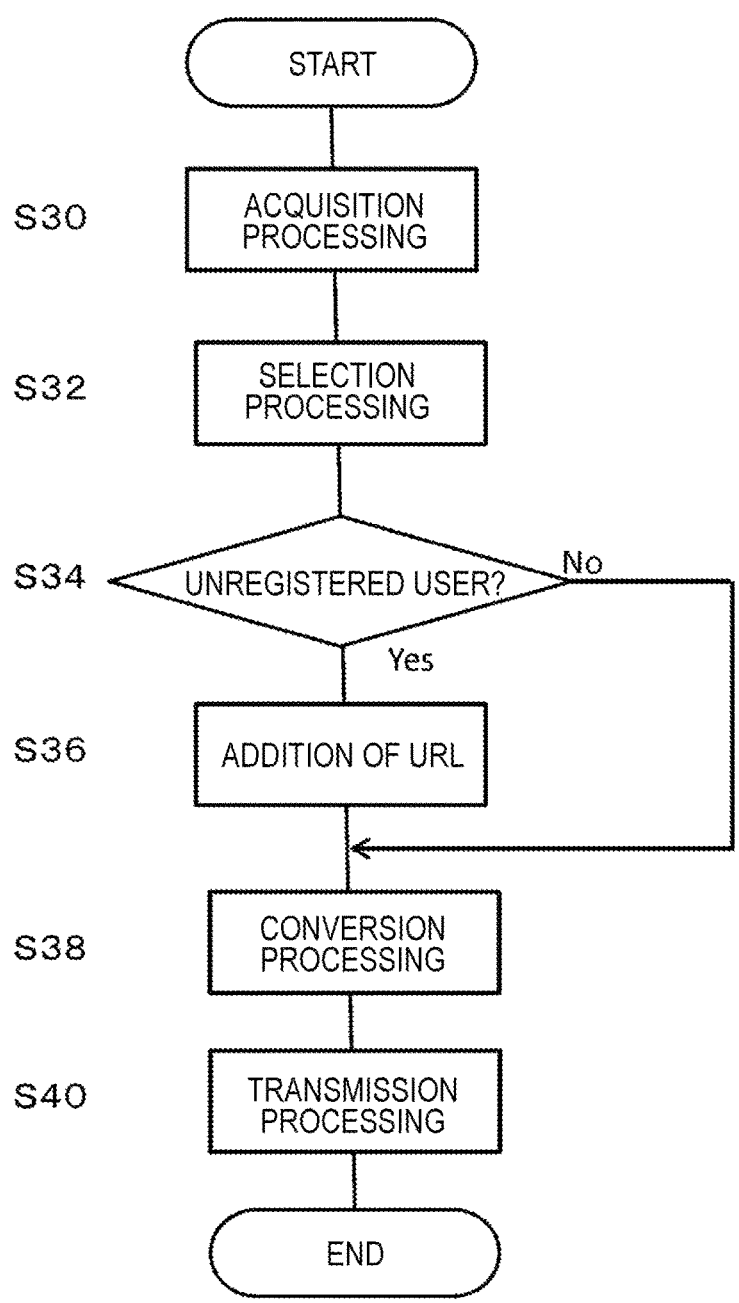
FIG. 11 is a flowchart illustrating a second processing procedure example of the email integration unit of FIG. 3.

FIG. 11 is a flowchart illustrating a second processing procedure example of the email integration unit 400 of FIG. 3. The second processing procedure example is started when the user terminal starts chatting.

The email integration unit 400 acquires a destination designated by the user and a message to be transmitted to the destination through the server reception unit 12 (S30). The email integration unit 400 selects one communication method from one or more communication methods of the contact information registered in the server memory 20 in relation to the destination, based on priority information indicating priority of the communication method to be applied (S32).

When the destination is an unregistered user (Yes of S34), the email integration unit 400 adds URL information for urging the unregistered user to participate in the chatting system, in the message to be transmitted (S36). In the case of the registered user (No of S34), the email integration unit 400 proceeds to processing of S38.

The email integration unit 400 performs conversion processing in the communication method selected in S32 with respect to the message to be transmitted (S38). Then, the email integration unit 400 causes the server transmission unit 16 to transmit the converted message to the destination designated by the user (S40).

According to the above aspect, the unregistered user can be registered as a friend in the friend list by determining other user to be recommended by using the predetermined condition set according to the presence or absence of registration in the chatting service. Also, even the unregistered user can become a friend by determining the unregistered user as other user to be recommended to the registered user when the user information of the unregistered user is included in the user information managed by the registered user. Also, with respect to a first user who is an unregistered user, by determining the registered user, who already adds the first user to the friend list when unregistered, as other registered user to be recommended after the first user becomes a registered user, a plurality of friends is recommended to the unregistered user from the beginning of new registration. Therefore, it is easy to form a friend relationship, and a motivation to use the chatting service can be increased.

Also, by determining the user as other user to be recommended to the registered user when the registered user is included in the friend list of the user, each user can registered as a friend in the friend list, and thus, a subsequent chatting can be smoothly performed. Also, when a message is transmitted and received between the user and the registered user on the chatting service at the present time or in the past, a user acquainted through the chatting can easily be registered as a friend by determining the user as other user to be recommended to the registered user.

Also, by determining the user as other user to be recommended to the registered user when the user and the registered user are associated in the same group, the user belonging to the same group can easily be registered as a friend.

Also, by determining the user as other user to be recommended to the registered user when one or more common users are included in the friend list, a user having many common friends can easily be registered as a friend. Also, by determining the user as other user to be recommended to the registered user when the user and the registered user are a friend on the SNS, a friend on the SNS can easily be registered as a friend on the chatting system.

Also, by determining the display order of one or more pieces of the searched user information, a user having a close relationship with the registered user can be preferentially displayed. Also, by determining the display order such that the priority of the user, in which the registered user is included in the friend list, has a high rank, the user adding oneself to the friend list can be preferentially displayed. Therefore, the registered user can efficiently know the user having a higher intimacy. Also, by displaying the users according to the number of chatting at the present time or in the past, the registered user can efficiently know the user estimated as having a higher intimacy. Also, by displaying the users such that the users having a larger number of groups registered by each other have a higher rank, the registered user can efficiently know the users estimated as having a higher intimacy.

Also, by selecting one communication method from one or more communication methods registered in the memory with respect to the received destination according to the information indicating the priority of the communication method to be applied, the communication method is automatically installed. Therefore, a burden of a user when transmitting a message can be reduced. Also, as a result of checking the acquired contact information and the registered contact information, when common information is included in the two pieces of the contact information, the acquired contact information is combined with the registered contact information. Therefore, a burden of a user when starting using the service can be reduced.

The present invention has been described based on the embodiments. The present invention is not limited to the above-described embodiments and the contents of the respective embodiments, but various modifications can be made without departing from the scope of the present invention. The above-described embodiments are exemplary, and it is understood by a person with ordinary skill in the art that various modifications can be made in the combination of respective components or processing processes of the embodiments, and such modifications fall within the scope of the present invention.

What is claimed is:

1. A server apparatus for controlling a message exchanged between registered users who are registered in a chatting service and controlling a message exchanged between a registered user and an unregistered user, the server apparatus comprising:
    a server memory configured to upload and manage user information of users other than registered users stored in user terminals of the respective registered users;
    a friend list management unit configured to manage a friend list of the registered user in the server memory;
    a suggest unit configured to determine other user to be added to the friend list with respect to the registered user; and
    a control unit configured to notify the other user determined by the suggest unit to the user terminal of the registered user, wherein the suggest unit determines the other user to be recommended to the registered user among the user information managed in the server memory by using a predetermined condition set according to presence or absence of registration in the chatting service;
    wherein when an unregistered user who is not registered in the chatting service and user information of the unregistered user are included in user information uploaded from the registered user, the suggest unit determines the unregistered user as other user to be recommended to the registered user;
    wherein when unregistered user information of the unregistered user is included in the user information uploaded from the registered user and mobile contact information is included in the unregistered user information, the suggest unit determines the unregistered user as other user to be recommended to the registered user;
    wherein the chatting service is an application configured to facilitate real time chat for a mobile terminal, and wherein the server apparatus is configured to exchange messages between a mobile terminal of the registered user and a mobile terminal of the unregistered user in real time, wherein the server apparatus is configured to retrieve mobile contact information of the unregistered user from the registered user; and
    the server apparatus further comprising:
    a group setting unit configured to set a plurality of groups each having particular characteristic; and
    a group management unit configured to manage the groups by associating groups selected by the registered user among the plurality of groups set by the group setting unit with the registered user, wherein when a user is registered in the chatting service and the user and the registered user are associated in the same group managed by the group management unit, the suggest unit determines the user as other user to be recommended to the registered user.

2. The server apparatus according to claim 1, further comprising a suggest list management unit configured to register user information of the other user determined by the suggest unit in a suggest list of the server memory, wherein the friend list management unit adds user information, which is selected by the registered user among the user information included in the suggest list, to the friend list, and the suggest list management unit deletes the user information from the suggest list, with the addition of the user information to the friend list.

3. The server apparatus according to claim 1, wherein with respect to a first user who is an unregistered user, the suggest unit determines a previously registered user, who already adds the first user to the friend list when being unregistered, as other registered user to be recommended after the first user becomes a registered user.

4. The server apparatus according to claim 1, wherein when a user is registered in the chatting service and the registered user is included in the friend list of the user, the suggest unit determines the user as other user to be recommended to the registered user.

5. The server apparatus according to claim 1, wherein when a user is registered in the chatting service and transmits and receives a message with the registered user on the chatting service at the present time or in the past, the suggest unit determines the user as other user to be recommended to the registered user.

6. The server apparatus according to claim 1, wherein when a user is registered in the chatting service and one or more common users are included in the friend list of each of the user and the registered user, the suggest unit determines the user as other user to be recommended to the registered user.

7. The server apparatus according to claim 1, wherein when a user is registered in the chatting service and the user and the registered user are a friend on a SNS, the suggest unit determines the user as other user to be recommended to the registered user.

8. The server apparatus according to claim 2, further comprising: a search unit configured to search one or more users to be displayed with respect to all pieces of user information stored in the server apparatus when a search is performed based on a request from the registered user, and with respect to users included in a suggest list of the registered user when there is no request from the registered user; a display order determination unit configured to determine display order of one or more pieces of user information searched by the search unit; and a display control unit configured to display the user information of the users searched by the search unit on a chatting window of the registered user in the order determined by the display order determination unit.

9. The server apparatus according to claim 8, wherein when a plurality of users is searched by the search unit, the display order determination unit determines the display order such that the priority of the user, in which the registered user is included in the friend list among the plurality of searched users, has a high rank.

10. The server apparatus according to claim 8, wherein when a plurality of users is searched by the search unit, the display order determination unit determines the display order such that the priority of the user has a higher rank as the user has a larger number of message transmission and reception with the registered user at the present time or in the past among the plurality of searched users.

11. The server apparatus according to claim 8, further comprising: a group setting unit configured to set a plurality of groups each having particular characteristic; and a group management unit configured to manage the groups by associating groups selected by the registered user among the plurality of groups set by the group setting unit with the registered user, wherein when a plurality of users is searched by the search unit, the display order determination unit determines the display order such that the priority of the user has a higher rank as the user has a larger number of groups associated with the registered user among the plurality of searched users.

12. The server apparatus according to claim 8, wherein when a plurality of users is searched by the search unit, the display order determination unit determines the display order such that the priority of the user has a higher rank as the user has a larger number of users commonly registered in the friend list of each other between the user and the registered user among the plurality of searched users.

13. The server apparatus according to claim 1, wherein the server apparatus is configured to exchange messages between the mobile terminal of the registered user and the mobile terminal of the unregistered user in real time through a conversion of the messages between the chatting service application and a messaging communication method utilized by the mobile terminal of the unregistered user.

* * * * *